(12) United States Patent
Yates

(10) Patent No.: US 6,858,134 B2
(45) Date of Patent: Feb. 22, 2005

(54) FLUID FILTRATION SYSTEM INCLUDING REPLACEABLE FILTER MODULE

(75) Inventor: Brian G. Yates, Holly Springs, NC (US)

(73) Assignee: Arvin Technologies, Inc., Troy, MI (US)

( * ) Notice: Subject to any disclaimer, the term of this patent is extended or adjusted under 35 U.S.C. 154(b) by 41 days.

(21) Appl. No.: 10/328,246

(22) Filed: Dec. 23, 2002

(65) Prior Publication Data

US 2004/0118761 A1 Jun. 24, 2004

(51) Int. Cl.$^7$ .............................................. B01D 35/027
(52) U.S. Cl. ...................... 210/168; 210/172; 210/234; 210/416.5; 210/429; 210/438; 210/450; 210/454
(58) Field of Search ................................. 210/168, 172, 210/234, 235, 416.5, 429, 438, 450, 454

(56) References Cited

U.S. PATENT DOCUMENTS

| | | | |
|---|---|---|---|
| 3,750,888 A | | 8/1973 | Rinaldo |
| 3,786,920 A | | 1/1974 | Raymond |
| 3,883,430 A | * | 5/1975 | Codo .......................... 210/132 |
| 4,053,410 A | * | 10/1977 | Lorimor ...................... 210/132 |
| 4,126,553 A | * | 11/1978 | Berg ........................... 210/130 |
| 4,272,368 A | * | 6/1981 | Foord et al. .................. 210/90 |
| 4,399,033 A | | 8/1983 | Rosaen et al. |
| 4,678,572 A | | 7/1987 | Hehl |
| 4,813,477 A | | 3/1989 | Hansen et al. |
| 5,049,269 A | * | 9/1991 | Shah ........................... 210/234 |
| 5,085,298 A | | 2/1992 | Sollami |
| 5,356,535 A | | 10/1994 | Ueno et al. |
| 5,676,842 A | | 10/1997 | Bedi et al. |
| 5,718,281 A | | 2/1998 | Bartalone et al. |
| 6,098,597 A | | 8/2000 | Warmoth et al. |
| 6,145,860 A | | 11/2000 | Yu et al. |
| 6,220,283 B1 | | 4/2001 | Saarinen et al. |
| 6,286,545 B1 | | 9/2001 | Moy et al. |

FOREIGN PATENT DOCUMENTS

| GB | 1003557 | 9/1965 |
|---|---|---|
| WO | WO 01/83307 A1 | 11/2001 |

OTHER PUBLICATIONS

European Search Report for EP Patent Application No. 03 25 8194, dated Apr. 5, 2004 (3 pages).

* cited by examiner

Primary Examiner—Matthew O. Savage
(74) Attorney, Agent, or Firm—Barnes & Thornburg LLP

(57) ABSTRACT

A fluid filtration system includes a filter receiver located in a fluid reservoir housing and a replaceable filter module adapted to mount in the filter receiver. Fluid to be filtered is exposed to a filter media included in the filter module and mounted in a filter chamber provided in the filter receiver. The filtered fluid is discharged into a fluid reservoir located in the fluid reservoir housing and outside the filter receiver. Low-pressure fluid is then pumped from the fluid reservoir to a fluid user and fluid discharged from the filter user is conducted to the filter chamber for filtration in the filter media.

17 Claims, 6 Drawing Sheets

FLUID FILTRATION SYSTEM INCLUDING REPLACEABLE FILTER MODULE

BACKGROUND AND SUMMARY

The present disclosure relates to fluid tanks, and particularly to a tank providing a hydraulic fluid reservoir. More particularly, the present disclosure relates to a filter for use in a hydraulic fluid tank.

Fluid filters are used onboard vehicles and in other apparatus containing fluid transport systems to remove unwanted solids or other contaminants from the fluid. Hydraulic fluid filters are used to clean hydraulic fluid use in hydraulic vehicle systems.

A fluid filtration system in accordance with the present disclosure includes a filter receiver located in a fluid reservoir housing and a replaceable filter module adapted to mount in the filter receiver. The filter receiver is formed to include a filter chamber sized to hold a filter media included in the filter module. Hydraulic fluid filtered by the filter media in the filter chamber is discharged into a fluid reservoir located in the fluid reservoir housing and outside of the filter receiver.

Fluid extant in the filter chamber of the filter receiver and in the fluid reservoir are maintained in a relatively low-pressure environment in the fluid reservoir housing. This low-pressure filtered fluid is pumped from the fluid reservoir and conducted to a "fluid user" (e.g., power steering system) onboard, for example, a vehicle. Fluid discharged by the fluid user is returned to the fuel reservoir housing and filtered as a result of exposure to the filter media in the filter chamber.

The filter module includes a connector coupled to the filter media. The connector is configured to mate with the filter receiver to retain the filter media in a proper position in the filter chamber. The filter module can be removed from the filter receiver and replaced.

Additional features of the disclosure will become apparent to one skilled in the art upon consideration of the following description of various embodiments which illustrate the best mode of carrying out the disclosure as presently perceived.

BRIEF DESCRIPTION OF THE DRAWINGS

The following detailed description refers particularly to the accompanying figures in which.

DETAILED DESCRIPTION

Figure 1:
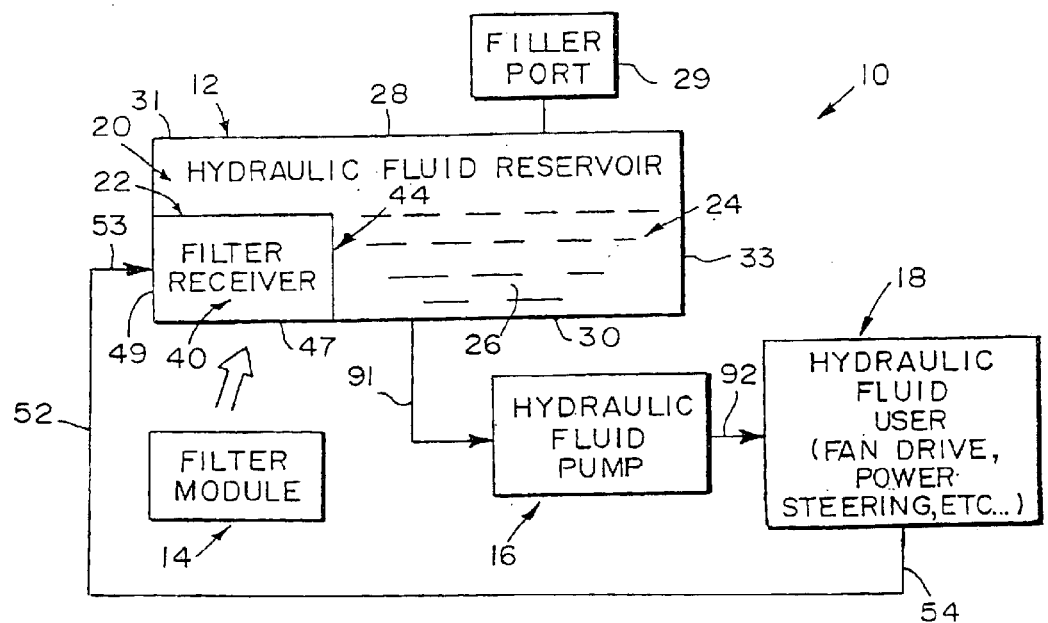
FIG. 1 is a diagrammatic view of a fluid filtration system including a filter module adapted to be mounted in a filter receiver provided in a fluid reservoir housing to filter hydraulic fluid conducted through the filter receiver into a hydraulic fluid reservoir also provided in the housing and located upstream from a hydraulic fluid pump and a hydraulic fluid user.

A fluid filtration system 10 including a "side-loading" fluid reservoir housing 12 adapted to receive a replaceable filter module 14 through an opening formed in a side wall 32 is suggested in FIGS. 1–5. Another fluid filtration system 210 including a "top-loading" fluid reservoir housing 212 adapted to receive a replaceable filter module 214 through an opening formed in a top wall 28 is suggested in FIGS. 9 and 10. An anti-drain valve 111 cooperating with a filter receiver 122 and a filter module 114 to block "reverse" flow of filtered fluid 26 from a fluid reservoir 24 in a fluid reservoir housing 12 into a filter module-receiving filter chamber 40 formed in filter receiver 122 during removal of filter module 114 from filter chamber 40 is suggested in the fluid filtration system 110 illustrated in FIGS. 6–8. These fluid filtration systems 10, 110, 210 are well-suited for use in automotive and marine applications.

A fluid filtration system 10 includes a fluid reservoir housing 12, a filter module 14, a fluid pump 16, and a fluid user 18 as shown diagrammatically in FIG. 1. Fluid reservoir housing 12 is formed to include an interior region 20 containing a filter receiver 22 for the filter module 14. Filter module 14 is configured to be mounted in filter receiver 22 to filter fluid passing therethrough and to be removed from filter receiver 22 when its useful life has ended to make way for a new filter module 14.

A fluid reservoir 24 is provided in interior region 20 of fluid reservoir housing to receive filtered fluid 26 discharged from filter receiver 22. Fluid pump 16 operates to pump low-pressure filtered fluid 26 from fluid reservoir 24 to a fluid user 18 and to cause "used fluid" discharged from the fluid user 18 to be urged to flow into filter receiver 22 to be filtered in filter module 14. In an illustrative embodiment, fluid filtration system 10 is carried onboard a vehicle (not shown) and fluid user 18 is a fan drive system, power steering system, or other user of hydraulic fluid onboard the vehicle.

Fluid reservoir housing 12 is configured to be mounted in an engine compartment of a vehicle (not shown) to supply hydraulic fluid to a fluid user 18 provided onboard the vehicle. As suggested in FIGS. 1–5, fluid reservoir housing 12 includes a top wall 28 formed to include a filler port 29, a floor 30 arranged to lie in opposing, spaced-apart relation to top wall 28 and several side walls 31, 32, 33, 34, 35, 36 extending between and cooperating with top wall 28 and floor 30 to define the interior region 20 of housing 12. Each side wall extends upwardly from floor 30 in a direction toward top wall 28. Filler port 29 is configured in any suitable manner and located in any suitable place on housing 12 to conduct fluid 26 to interior region 20 and is closed, for example, by means of a removable cap 38 mounted on a filler neck 39 defining filler port 29.

Figure 2:
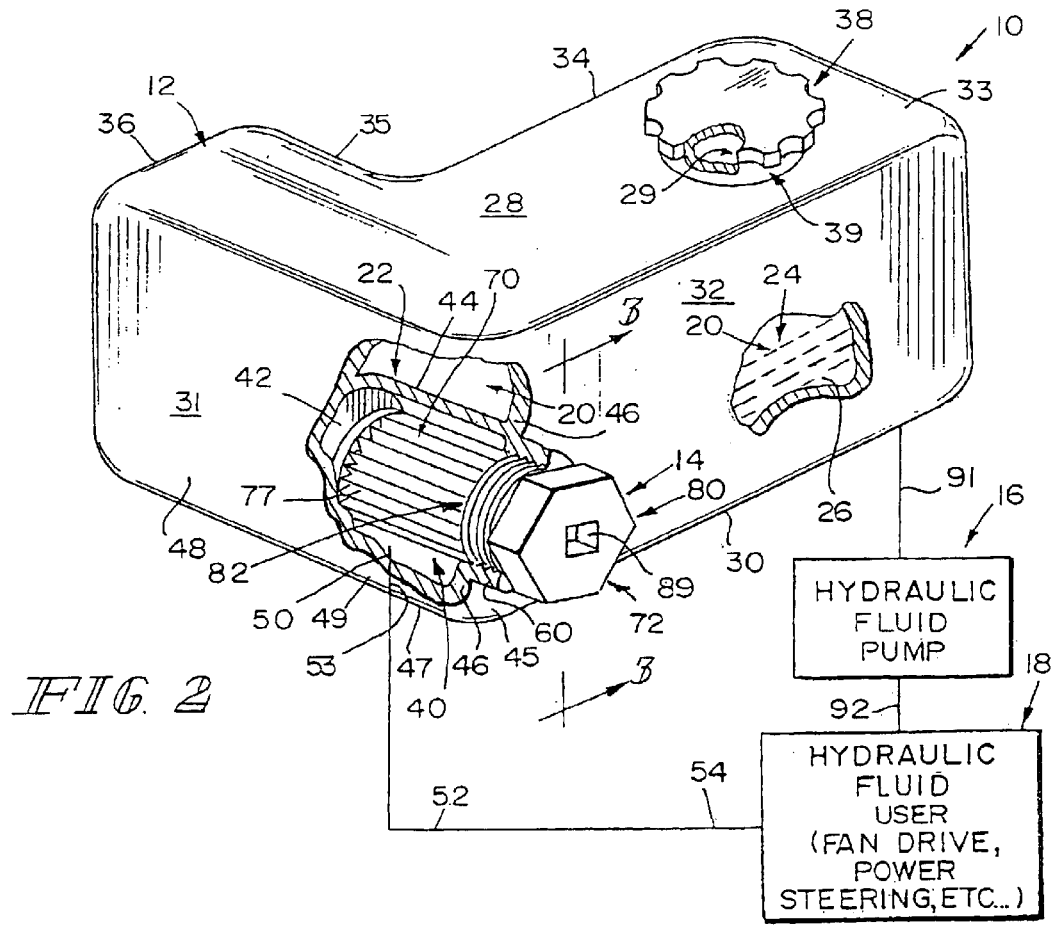
FIG. 2 is a perspective view of one embodiment of the fluid filtration system of FIG. 1, with portions broken away, showing orientation of a filter receiver to have a filter element-receiving aperture formed in a side wall of a fluid reservoir housing and placement of a filter module in the filter receiver.
Figure 3:
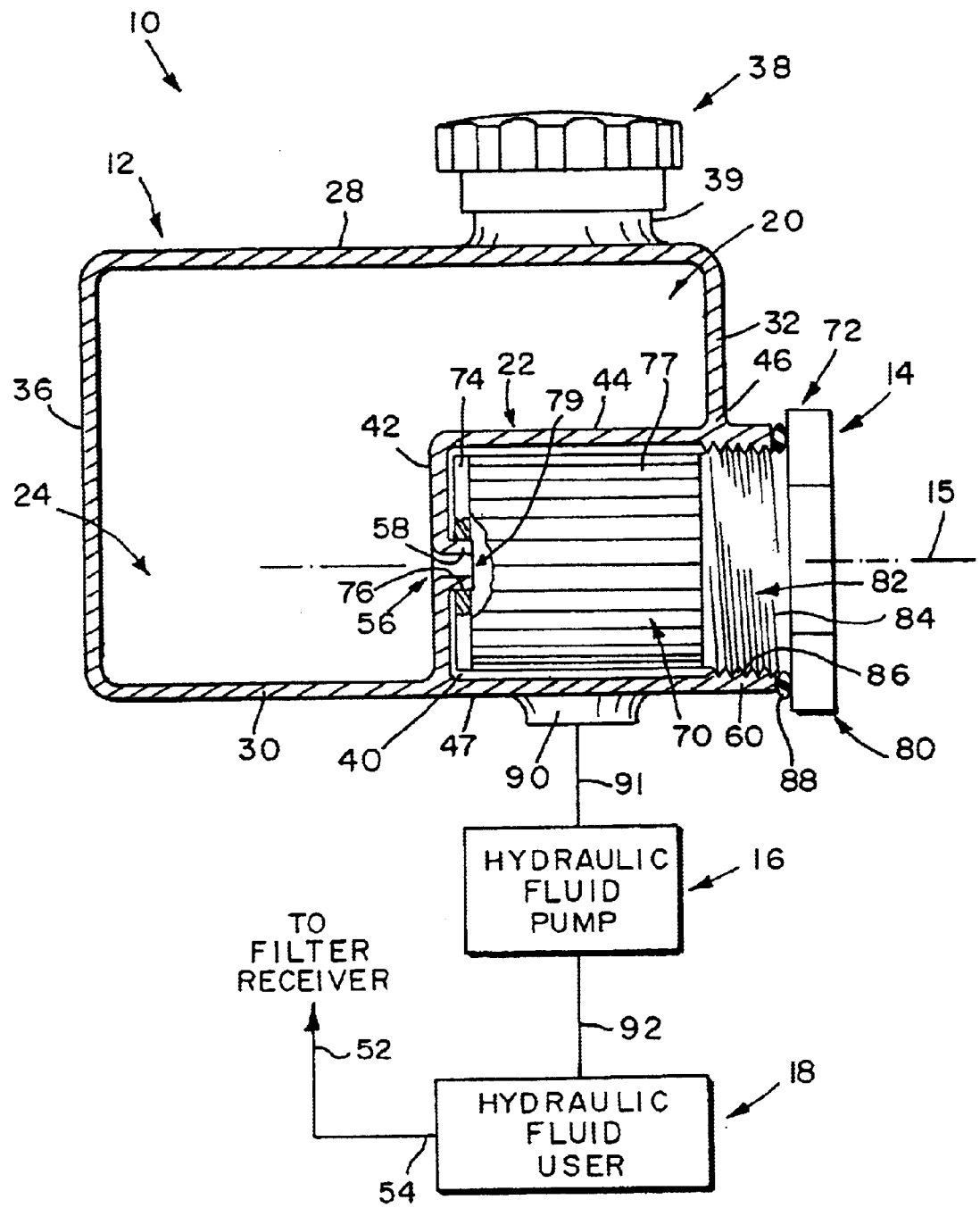
FIG. 3 is a sectional view taken along line 3—3 of FIG. 2 showing the position of the filter module in the filter receiver provided in the fluid reservoir housing and showing a fluid outlet port formed in the floor of the fluid reservoir housing to discharge filtered fluid from the fluid reservoir to the hydraulic fluid pump.
Figure 4:
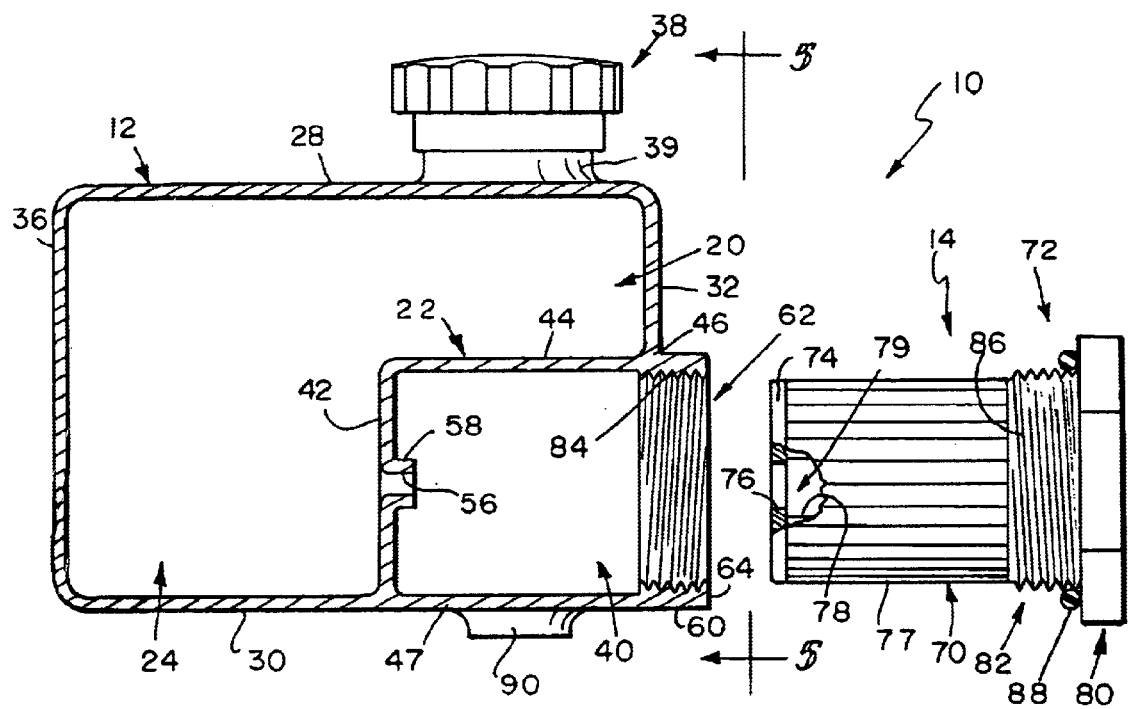
FIG. 4 is a sectional view similar to FIG. 3 showing the filter module after it has been removed from the filter receiver to begin the process of filter module replacement.

Filter receiver 22 is arranged to extend into interior region 20 of fluid reservoir housing 12 and formed to include a filter chamber 40 sized to receive a portion of filter module 14 therein as suggested in FIGS. 2–4. Filter receiver 22 includes an end wall 42 and longitudinal wall 44 as suggested in FIGS. 2–4. End wall 42 is coupled to floor 30 and first side wall 31 of housing 12. Longitudinal wall 44 is arranged to extend from a perimeter edge of end wall 42 to a receiver aperture 46 formed in second wall 32 of housing 12. In the illustrated embodiment, end wall 42 has a flat shape and longitudinal wall 44 has a curved shape. In the illustrated embodiment, fluid reservoir housing 12 and filter receiver 22 comprise a monolithic member formed using blow-molding or injection-molding processes.

As suggested in FIGS. 2–5, first side wall 31 of housing 12 is arranged to define a portion 48 of the boundary of fluid reservoir 24 and to define a portion 49 of the boundary of filter chamber 40. End wall 42, longitudinal wall 44, portion 49 of first side wall 31, a portion 47 of floor 30, and a portion 45 of second side wall 32 cooperate to define the boundary of filter chamber 40 in the illustrated embodiment.

Portion 49 of first side wall 31 is formed to include a fluid inlet port 50 to allow "unfiltered" fluid (e.g., fluid discharged from fluid user 18) to flow into filter chamber 40. A fluid supply hose 52 has an inlet end 54 coupled to a fluid discharge outlet of fluid user 18 and an outlet end 53 coupled to fluid inlet port 50 to conduct unfiltered fluid discharged from fluid user 18 into filter chamber 40 to be filtered by filter module 14 as suggested in FIGS. 2 and 5.

Figure 5:
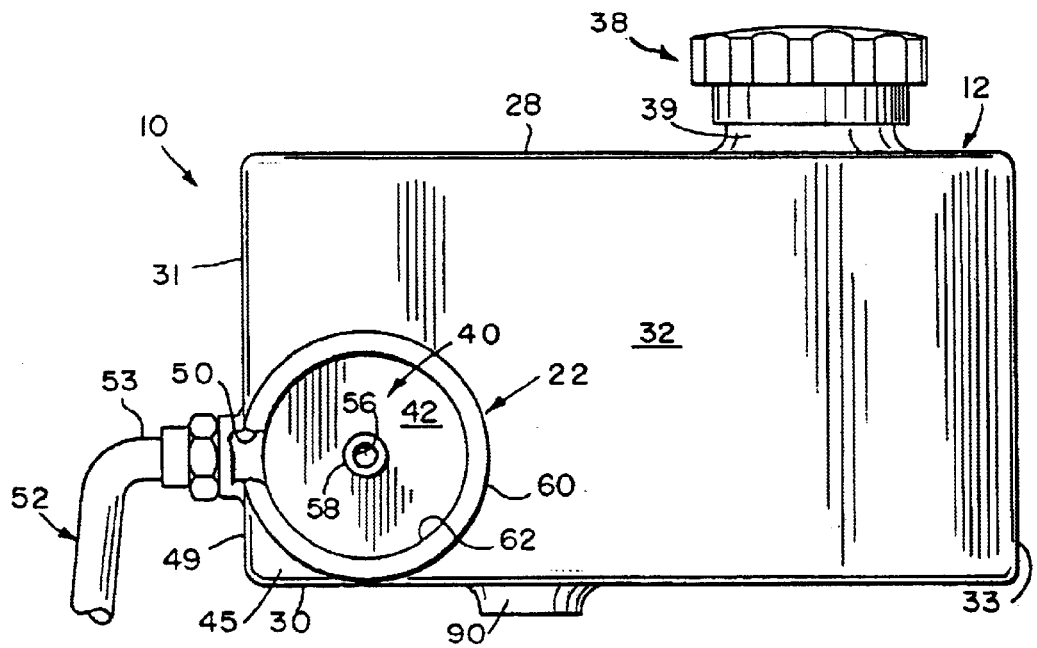
FIG. 5 is an end view of the fluid reservoir housing taken along line 5—5 of FIG. 4 showing an empty filter receiver and a fluid supply hose coupled to the filter receiver to deliver unfiltered fluid from the hydraulic fluid user to the filter receiver through a fluid inlet port formed in a side wall of the fluid reservoir housing.

End wall 42 of filter receiver 22 is formed to include a fluid outlet port 56 as suggested in FIGS. 3–5 to discharged filtered fluid 26 from filter chamber 40 into fluid reservoir 24 provided in interior region 20 of housing 12 outside of filter receiver 22. In the illustrated embodiment, end wall 42 is formed to include a discharge conduit 58 configured to define fluid outlet port 56 and cantilevered to end wall 42 to extend into filter chamber 40 in a direction toward second side wall 32 of housing 12. Discharge conduit 58 acts as a centering boss to align the filter module 14 properly in filter chamber 40 and minimize vibration of the cantilevered filter module 14.

Filter receiver 22 includes an inner portion (defined by end wall 42 and longitudinal wall 44) arranged to lie in interior region 20 of housing 12 and an outer portion 60 arranged to lie outside of interior region 20 of housing 12 as suggested in FIGS. 2–5. Outer portion 60 is defined by an annular rim that is cantilevered to second side wall 46 of housing 12 at receiver aperture 32 formed in second side wall 32. Outer portion 60 is formed to include a filter module-receiving aperture 62 opening into filter chamber 40 as shown best in FIGS. 4 and 5. Outer portion 60 includes an annular edge 64 located at an outermost end and adapted to mate with a sealing gasket 88 included in filter module 14.

Filter module 14 includes a filter media 70 and a connector 72 coupled to filter media 70 as shown, for example, in FIGS. 2–4. Filter module 14 also includes a base 74 formed to include a conduit receiver 76 arranged to mate with discharge conduit 58 of end wall 42 as shown, for example, in FIG. 3. Filter media 70 is positioned to lie between base 74 and connector 72. Connector 72 is configured to mate with filter receiver 22 at filter module-receiving aperture 62 to expose filter media 70 to unfiltered fluid passing through filter chamber 40 from fluid inlet port 50 to fluid outlet port 56 into fluid reservoir 24 provided in interior region 20 of fluid reservoir housing 12.

Filter media 70 includes an exterior portion 77 located in filter chamber 40 to contact fluid admitted into filter chamber 40 through fluid inlet port 50. Filter media 70 also includes an interior portion 78 defining a filtered-fluid region 79 located in filter media 70 to receive fluid that has passed through filter media 70 from exterior portion 77 to interior portion 78. Fluid that has been filtered in filter media 70 passes from filtered-fluid region 79 in filter media 70 into fluid reservoir 24 in fluid reservoir housing 12 through fluid inlet port 56 formed in discharge conduit 58. It is within the scope of this disclosure to use pleated cellulose, synthetic, or stainless steel mesh to form filter media 70.

Connector 72 of filter module 14 includes an outer cover 80 and a mount 82 located between filter media 70 and outer cover 80 as shown, for example, in FIG. 4. Mount 82 is configured to mate with filter receiver 22 to support filter media 70 in filter chamber 40. In the illustrated embodiment, mount 82 includes external threads 86 and filter receiver 22 includes internal threads 84 arranged to extend into filter chamber 40 to mate with external threads 86 of mount 82 to retain filter media 70 in a fixed position in filter chamber 40 as suggested, for example, in FIGS. 2 and 3. Also in the illustrated embodiment, most of internal threads 84 are formed on outer portion 60 of filter receiver 22 as suggested, for example, in FIG. 4. Thus, filter module 14 is inserted into filter chamber 40 and is secured by a threaded connector which forms both the supporting mechanism for the filter module and the sealing method for the outer end of the filter module. In the illustrated embodiment, connector 72 is made of a nylon material.

A sealing gasket 88 is positioned on connector 72 as suggested, for example, in FIG. 4. Sealing gasket 88 is arranged to establish a sealed connection between filter receiver 22 and outer cover 80 once mount 82 is mated with outer portion 60 of filter receiver 22 to fix filter media 70 in filter chamber 40. In the illustrated embodiment, sealing gasket 88 mates with annular edge 64 when filter module 14 is mounted in filter receiver 22. In the illustrated embodiment, sealing gasket 88 is an O-ring seal carried in an annular groove formed in mount 82 in a location between external threads 86 and outer cover 80.

Outer cover 80 has a major diameter that is larger than the outer diameter of external threads 86 as shown, for example, in FIG. 4. Outer cover 80 has a hexagonal shape and is formed to include a square drive cavity or blade-receiving slot 89 configured to receive a tool (not shown) to rotate filter module 14 relative to filter receiver 22 about an axis of rotation 15 during movement of filter module 14 into and out of filter chamber 40.

Floor 30 of fluid reservoir housing 12 is formed to include a filtered fluid outlet 90 configured to discharge filtered fluid 26 from fluid reservoir 24 in housing 12. Filtered fluid outlet 90 is coupled to fluid pump 16 by fluid conductor tube 91 and fluid pump 16 is coupled to fluid user 18 by fluid conductor tube 92. Fluid user 18 is coupled to fluid inlet port 50 in first side wall 31 of housing 12 by fluid supply hose 52. Floor 30 is arranged to underlie the filter media 70 retained in filter chamber 40.

Hydraulic systems in automotive applications which incorporate one or more hydraulic systems (e.g., fan drive, power steering, transmission, and active stabilization) require additional connections and hose routings to incorporate an inline hydraulic fluid filter. Such a filter would need to be configured to meet high-pressure specifications and be designed for the life of the vehicle operation with little or no maintenance. In contrast, fluid filtration system 10 includes a replaceable filter module 14 that can be mounted in a "low-pressure" side of the system prior to (i.e., upstream of) fluid pump 16 to avoid the need to mount filter module 14 in a high-pressure housing. Filter module 14 is adapted to be mounted in a filter receiver 22 provided in fluid reservoir housing 12 to allow for replacement of filter module 14 as needed.

In use, fluid to be filtered is drawn into filter chamber 40 provided in a filter receiver 22 mounted in fluid reservoir housing 12 through a side wall inlet port 50. The fluid then passes through a filter media 70 included in filter module 14 and retained in filter chamber 40. A stream of filtered fluid 26 discharged from filtered-fluid region 79 in filter media 70 passes through fluid outlet port 56 formed in end wall 42 of filter receiver 22 and into the fluid reservoir 24 located in interior region 20 of housing 12 outside of filter receiver 22. Fluid 26 is then available to be withdrawn from fluid reservoir through a filtered fluid outlet 90 formed in floor 30 of housing 12.

An outer end of filter module 14 is formed to include an outer cover 80 and a threaded mount 82. A sealing gasket 88 is carried adjacent to outer cover 80. Mount 82 is coupled to one end of a pleated filter media sleeve 70 to permit a user to install filter module 14 in filter receiver 22 by inserting the pleated filter media sleeve 70 into filter chamber 40 and turning filter module 14 about a central axis 15 thereof to engage the external threads 86 of mount 82 with the internal threads 84 of filter receiver 22 formed at the filter module-receiving aperture 62 opening into filter chamber 40.

Figure 6:
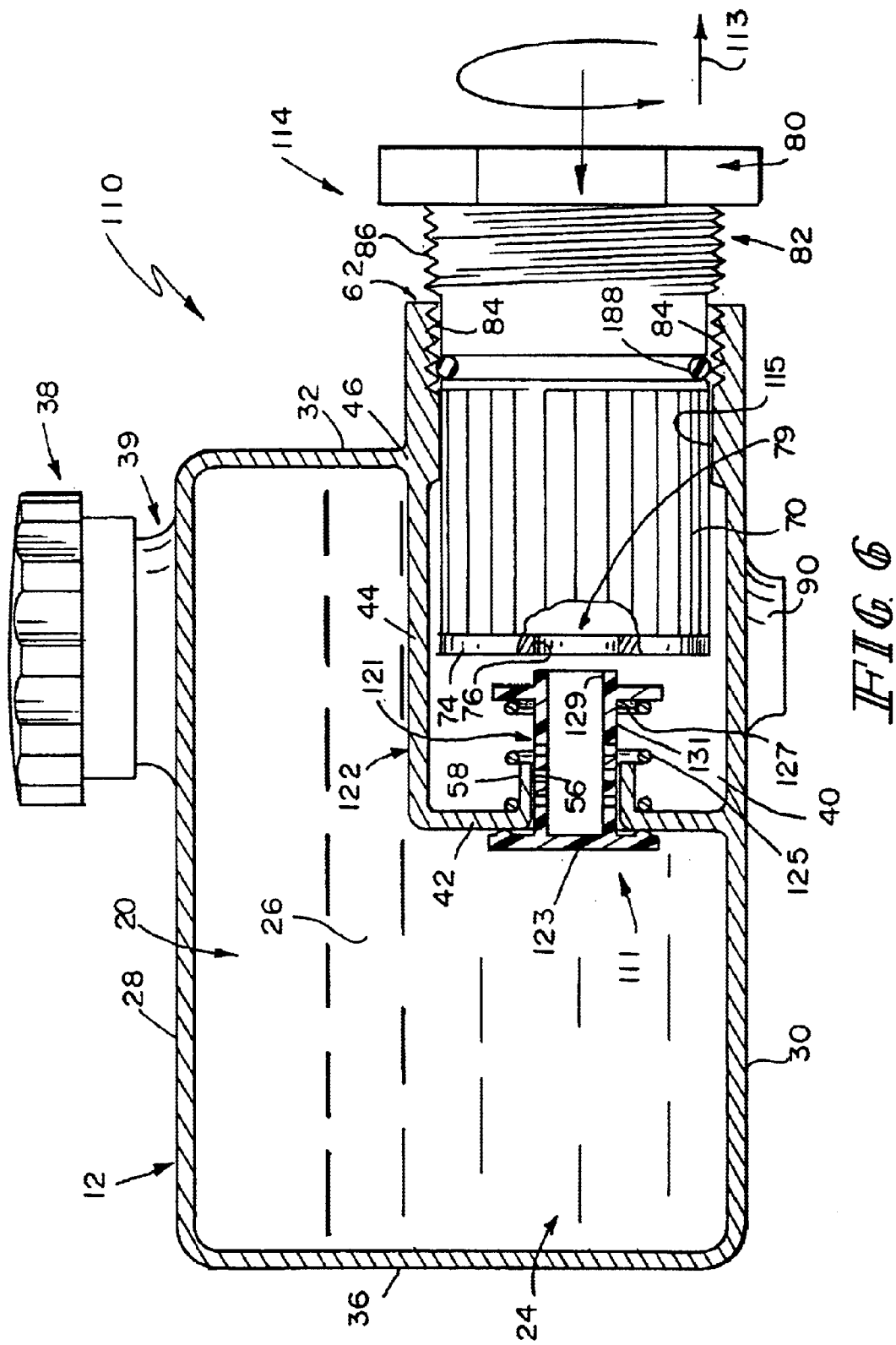
FIG. 6 is a sectional view similar to FIGS. 3 and 4 of a hydraulic fluid system in accordance with another embodiment of the disclosure showing an anti-drain valve mounted on a vertical end wall of the filter receiver to mate with a filter module during insertion of the filter module into the filter receiver.
Figure 7:
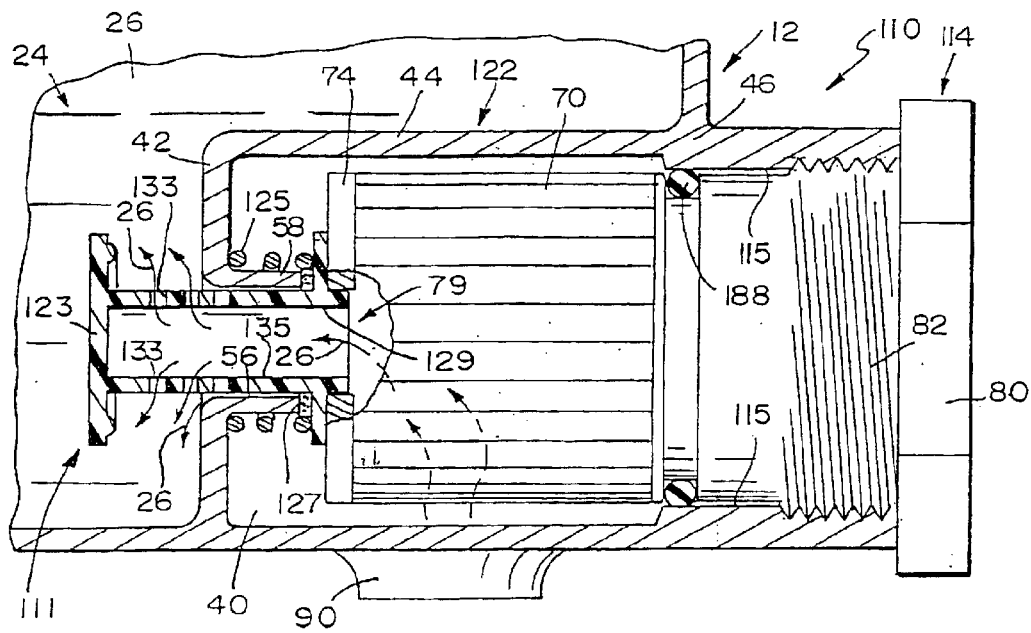
FIG. 7 is a sectional view similar to FIG. 6 showing the filter module mounted in the filter receiver and showing unfiltered hydraulic fluid flowing from the filter chamber into a filter media included in the filter module and then flowing through the anti-drain valve into the fluid reservoir provided in the fluid reservoir housing.
Figure 8:
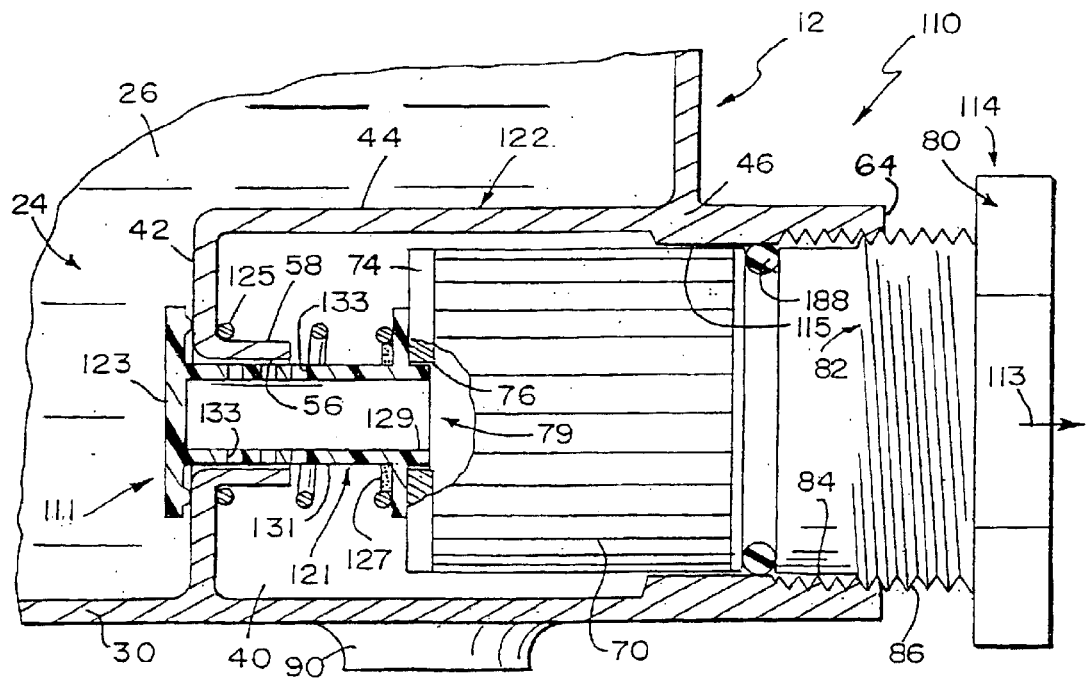
FIG. 8 is a sectional view similar to FIGS. 6 and 7 showing movement of the anti-drain valve to a closed position to block "reverse" flow of filtered fluid in the fluid reservoir into the filter chamber provided in the filter receiver during removal of the filter module from the filter receiver.

A fluid filtration system 110 in accordance with another embodiment of this disclosure is illustrated in FIGS. 6–8. In this embodiment, a filter receiver 122 similar to filter receiver 22 of FIGS. 2–5 is provided in fluid reservoir housing 12. However, in this embodiment, filter receiver 122 includes an annular inner sealing surface 115 arranged to position internal threads 84 between annular inner sealing surface 115 and annular edge 64. This annular sealing surface 115 is arranged to engage sealing gasket 188 included in filter module 114 as filter module 114 is mounted in the filter chamber 40 provided in filter receiver 122.

In the embodiment of FIGS. 6–8, fluid filtration system 110 further includes anti-drain means 111 for closing fluid outlet port 56 formed in discharge conduit 58 in response to movement of filter module 114 in filter chamber 40 in a removal direction 113 through the filter module-receiving aperture 62 and before separation of sealing gasket 188 from annular inner sealing surface 115 of filter receiver 122 to "break" the sealed connection between gasket 188 and surface 115. Anti-drain means 111 functions to block "reverse" flow (in direction 113) of filtered fluid 26 from fluid reservoir 24 into filter chamber 40 through fluid outlet port 56 during removal of filter module 114 from filter chamber 40 of filter receiver 122.

Anti-drain valve 111 is coupled to filter receiver 122 at fluid outlet port 56 as suggested, for example, in FIG. 6. Anti-drain valve 111 includes a tube 121 mounted for movement in fluid outlet port 56, a closure plate 123 positioned to lie in fluid reservoir 24 and coupled to tube 121 to move therewith, a spring 125, and a sealing gasket 127. Spring 125 is coupled and arranged normally to urge tube 121 to move relative to end wall 42 to assume a closed position (shown in FIG. 6) wherein closure plate 123 mates with end wall 42 to block reverse flow of filtered fluid 26 from fluid reservoir 24 into filter chamber 40 during removal of filter module 114 from filter chamber 40. Sealing gasket 127 is mounted on an exterior portion of tube 121 and arranged to mate with filter receiver 122 (e.g., discharge conduit 58) to block flow of unfiltered fluid 26 around tube 121 and through fluid outlet port 56 into fluid reservoir 24 upon installation of filter module 114 in filter receiver 122.

Tube 121 of anti-drain valve 111 includes a first end configured to mate with filter module 114 (e.g., conduit receiver 76 in base 74) and formed to include an inlet aperture 129 located to receive filtered fluid 26 discharged from filtered-fluid region 79 of filter media 70. Anti-drain valve 111 also includes a second end coupled to closure plate 123 and a tubular middle section 131 extending between the first and second ends. Tubular middle section 131 is formed to include at least one exit aperture 133 and a discharge passageway 135 extending from inlet aperture 129 at least to exit apertures 133. Each exit aperture 133 is located to allow filtered fluid 26 extant in discharge passageway 135 to flow into fluid reservoir 24 as shown, for example, in FIG. 7 upon separation of closure plate 123 from end wall 42 of filter receiver 122 in response to movement of tube 122 in fluid outlet port 56 to assume an opened position following installation of filter module 114 in filter receiver 122.

Figure 9:
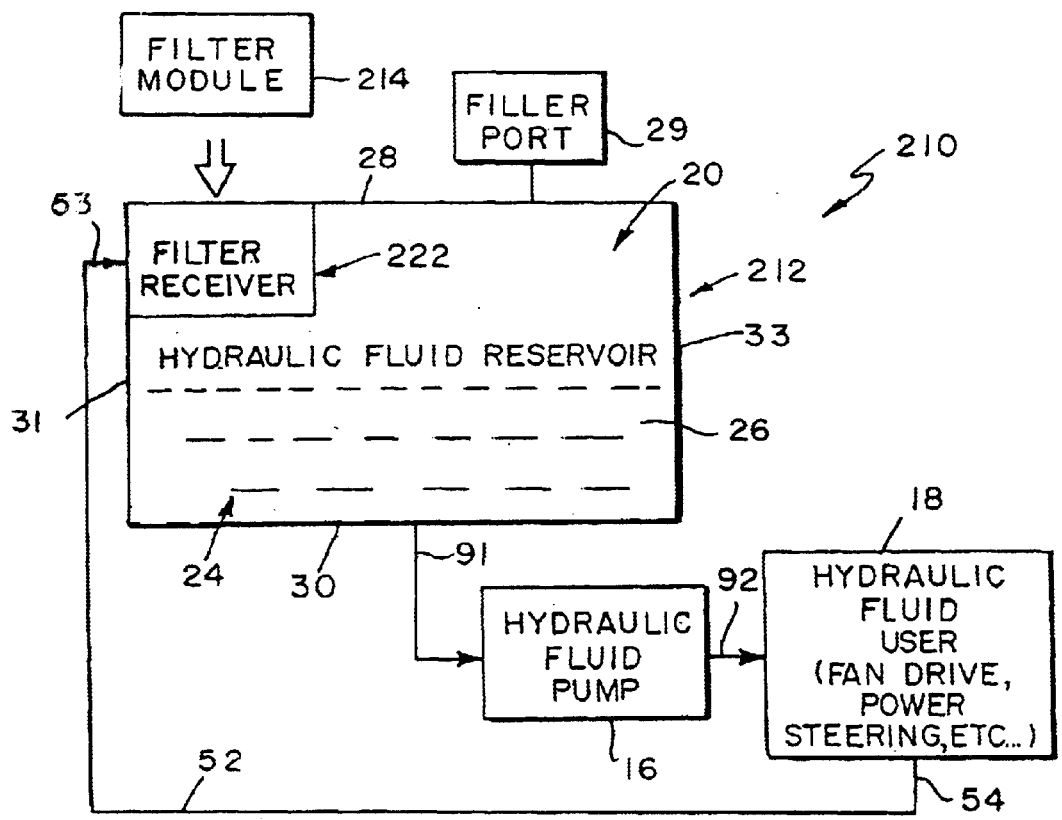
FIG. 9 is a diagrammatic view of a fluid filtration system in accordance with yet another embodiment of the disclosure.
Figure 10:
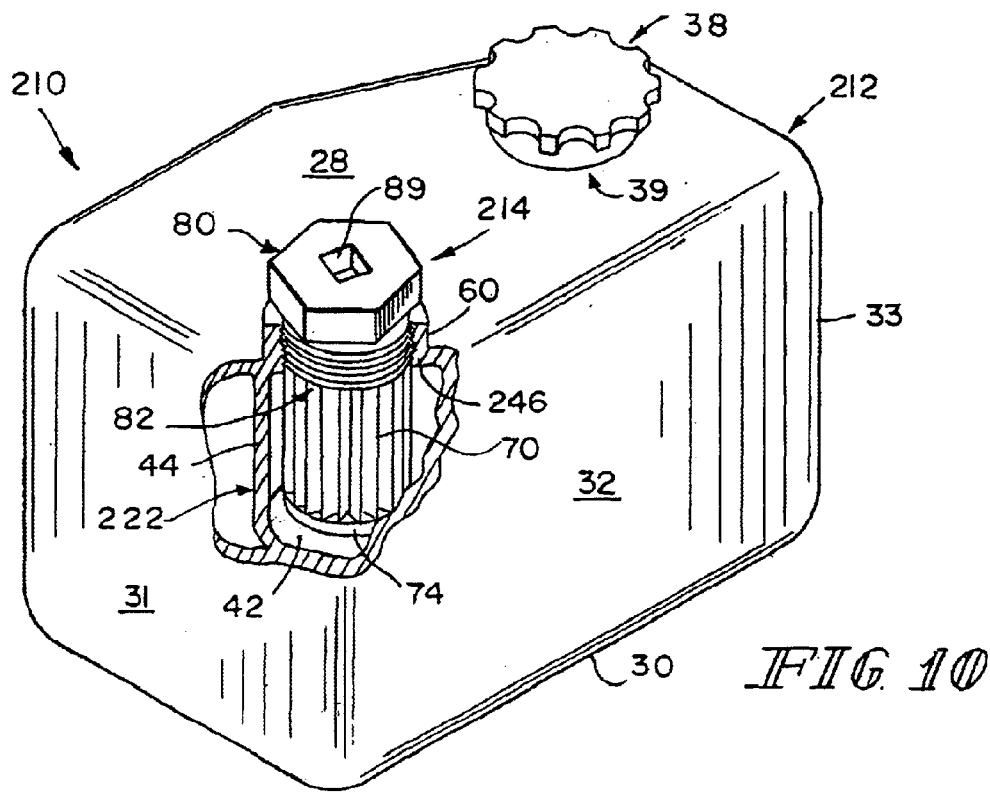
FIG. 10 is a perspective view of one embodiment of the fluid filtration system of FIG. 9, with portions broken away, showing orientation of a filter receiver to have a filter element-receiving aperture in a top wall of a fluid reservoir housing and placement of a filter module in the filter receiver.

A fluid filtration system 210 in accordance with another embodiment of this disclosure is illustrated in FIGS. 9 and 10. In this embodiment, the filter receiver 222 is arranged to cause the receiver aperture 246 to be formed in top wall 28 of fluid reservoir housing 212. Therefore, filter module 214 can be "dropped" into filter receiver 222 through the aperture formed in the top wall 28 of fluid reservoir housing 212.

What is claimed is:

1. A fluid filtration system comprising
a fluid reservoir housing formed to include an interior region and a filler port configured to conduct fluid to the interior region,
a filter receiver arranged to extend into the interior region of the fluid reservoir housing, the filter receiver being formed to include a filter chamber and filter module-receiving aperture opening into the filter chamber, a fluid inlet port configured to admit unfiltered fluid into the filter chamber, and a fluid outlet port configured to discharge filtered fluid from the filter chamber into a fluid reservoir provided in the interior region of the fluid reservoir housing,
a filter module including a filter media and a connector coupled to the filter media and configured to mate with the filter receiver at the filter module-receiving aperture to expose the filter media to unfiltered fluid passing through the filter chamber from the fluid inlet port toward the fluid outlet port to produce a stream of filtered fluid passing through the fluid outlet port into the fluid reservoir provided in the interior region of the fluid reservoir housing, and an anti-drain valve arranged to move to an opened position opening the fluid outlet port to allow flow of filtered fluid from the filter chamber through the fluid outlet port to the fluid reservoir in response to installation of the filter module through the filter module-receiving aperture into the filter chamber and arranged to move to a normally closed position closing the fluid outlet port to block reverse flow of filtered fluid from the fluid reservoir through the fluid outlet port to the filter chamber in response to removal of the filter module from the filter chamber through the filter module-receiving aperture.

2. The system of claim 1, wherein the fluid reservoir housing is formed to include a filtered fluid outlet configured to discharge filtered fluid from the fluid reservoir, a fluid user coupled to the fluid inlet port formed in the filter receiver to deliver unfiltered fluid discharged from the fluid user into the filter chamber, and a fluid pump coupled to the filtered fluid outlet and to the fluid user and configured to pump filtered fluid discharged from the fluid reservoir housing to the fluid user and urge unfiltered fluid discharged from the fluid user into the filter chamber to be filtered by the filter media located therein.

3. The system of claim 2, wherein the fluid reservoir housing further includes a floor arranged to underlie the filter media upon placement of the filter media in the filter chamber and a first side wall extending upwardly from the floor, the floor is formed to include the filtered fluid outlet, and the first side wall is formed to include the fluid inlet port.

4. The system of claim 3, wherein the fluid reservoir housing further includes a second side wall extending upwardly from the floor and lying at an angle relative to the first side wall, the second side wall is formed to include a receiver aperture, and the filter receiver is arranged in the interior region of the fluid reservoir housing to mate with the second wall at the receiver aperture.

5. The system of claim 1, wherein the fluid reservoir housing includes a wall formed to include a receiver aperture and the filter receiver extends through the receiver aperture to cause an inner portion of the filter receiver to lie in the interior region of the fluid reservoir housing.

6. The system of claim 1, wherein the connector includes an outer cover and a mount located between the filter media and the outer cover and configured to mate with the filter receiver.

7. The system of claim 6, wherein the mount includes external threads and the filter receiver includes internal threads arranged to extend into the filter chamber to mate with the external threads of the mount to retain the filter media in a fixed position in the filter chamber.

8. The system of claim 6, wherein the filter module further includes a base formed to include a conduit receiver, the filter media is positioned to lie between the base and the mount, the filter media includes an exterior portion located in the filter chamber to contact fluid admitted into the filter chamber through the fluid inlet port, the filter media is formed to include an interior portion defining a filter-fluid region located in the filter media to receive fluid that has passed through the filter media from the exterior portion to the interior portion, and the filter receiver includes an end wall formed to include a discharge conduit configured to define the fluid outlet port and arranged to mate with the conduit receiver of the base of the filter module to allow filtered fluid discharged from the filtered-fluid region of the filter media to pass into the fluid reservoir provided in the interior region of the fluid reservoir housing.

9. The system of claim 8, wherein the fluid reservoir housing includes a side wall arranged to define a portion of the boundary of the fluid reservoir and to define a portion of the boundary of the filter chamber and the side wall is formed to include the fluid inlet port to allow unfiltered fluid to flow therethrough into the filter chamber to pass through the filter media to reach the filtered-fluid region therein and pass into the fluid reservoir via the discharge conduit.

10. The system of claim 8, wherein the anti-drain valve is arranged for closing the discharge conduit in response to removal of the filter module from the filter chamber to block reverse flow of filtered fluid from the fluid reservoir into the filter chamber through the fluid outlet port.

11. The system of claim 1, wherein the filter module further includes a sealing gasket arranged to mate with an inner sealing surface of the filter receiver to establish a sealed connection therebetween to block discharge of fluid from the filter chamber through the filter module-receiving aperture following insertion of the filter media into the filter chamber, and the anti-drain valve is arranged for closing the fluid outlet port in response to movement of the filter module in the filter chamber in a removal direction through the filter module-receiving aperture and before separation of the sealing gasket from the inner sealing surface of the filter receiver to break the sealed connection therebetween so that reverse flow of filtered fluid from the fluid reservoir into the filter chamber through the fluid outlet port is blocked during removal of the filter module from the filter chamber.

12. The system of claim 1, wherein the filter receiver includes an end wall coupled to the fluid reservoir housing and formed to include the fluid outlet port and a longitudinal wall extending from the end wall in a direction toward the filter module-receiving aperture, the filter media includes an exterior portion located in the filter chamber to contact fluid admitted into the filter chamber through the fluid inlet port, the filter media is formed to include an interior region defining a filtered-fluid region located in the filter media to receive fluid that has passed though the filter media from the exterior portion to the interior portion, the anti-drain valve is coupled to the filter receiver at the fluid outlet port and includes a tube mounted for movement in the fluid outlet port, a closure plate positioned to lie in the fluid reservoir and coupled to the tube to move therewith, a spring arranged normally to urge the tube to move relative to the end wall to assume the closed position wherein the closure plate mates with the end wall to block reverse flow of filtered fluid from the fluid reservoir into the filter chamber during removal of the filter module from the filter chamber, and a sealing gasket mounted on an exterior portion of the tube and arranged to mate with the filter receiver to block flow of unfiltered fluid around the tube and through the fluid outlet port into the fluid reservoir upon installation of the filter module in the filter receiver, the tube includes a first end configured to mate with the filter module and formed to include an inlet aperture located to receive fluid discharged from the filtered-fluid region of the filter media, a second end coupled to the closure plate, and a tubular middle section extending between the first and second ends and formed to include an exit aperture and a discharge passageway extending from the inlet aperture to the exit aperture, and the exit aperture is located to allow filtered fluid extant in the discharge passageway to flow into the fluid reservoir upon separation of the closure plate from the filter receiver in response to movement of the tube in the fluid outlet port to assume the opened position following installation of the filter module in the filter receiver.

13. A fluid filtration system comprising a fluid reservoir housing formed to include an interior region and a filler port configured to conduct fluid into the interior region, the fluid reservoir housing including a top wall, a floor in opposing spaced-apart relation to the top wall, a first side wall coupled to the top wall and the floor, and a second side wall coupled to the top wall and the floor, a filter receiver arranged to extend into the interior region of the fluid reservoir housing, the filter receiver including an end wall coupled to the first side wall of the fluid reservoir housing and a longitudinal wall arranged to extend from the end wall to a receiver aperture formed in the second wall of the fluid reservoir housing, the end wall, longitudinal wall, and portions of the first and second side walls cooperating to define a filter chamber therebetween, the filter receiver also being formed to include a filter module-receiving aperture opening into the filter chamber, the first side wall being formed to include a fluid inlet port configured to admit unfiltered fluid into the filter chamber, the end wall being formed to include a fluid outlet port configured to discharged filtered fluid from the filter chamber into a fluid reservoir provided in the interior region of the fluid reservoir housing and outside of the filter receiver, and a filter module including a filter media and a connector coupled to the filter media and configured to mate with the filter receiver to expose the filter media to unfiltered fluid passing through the filter chamber from the fluid inlet port to the fluid outlet port and into the fluid reservoir provided in the fluid reservoir housing.

14. The system of claim 13, wherein an outer portion of the filter receiver is configured to mate with the connector of the filter module to position the filter media in the filter chamber and the outer portion is arranged to lie outside of the interior region of the fluid reservoir housing.

15. The system of claim 14, wherein the connector includes an outer cover and a mount located between the filter media and the outer cover and the mount is configured to mate with the outer portion of the filter receiver.

16. The system of claim 15, wherein the filter module further includes a sealing gasket positioned on the connector to establish a sealed connection between the outer portion of the filter receiver and the outer cover once the mount is mated with the outer portion of the filter receiver to fix the filter media in the filter chamber.

17. The system of claim 13, wherein the fluid reservoir housing is formed to include a filtered fluid outlet configured to discharge filtered fluid from the fluid reservoir and further comprising means for pumping low-pressure filtered fluid discharged from the fluid reservoir through the filtered fluid outlet to a fluid user and conducting fluid discharged from the fluid reservoir through the filtered fluid outlet to a fluid user and conducting fluid discharged from the fluid user into the filter chamber for filtration in the filter media through the fluid inlet port formed in the first side wall.

* * * * *